(12) United States Patent
Sos-Munoz et al.

(10) Patent No.: US 10,360,201 B2
(45) Date of Patent: Jul. 23, 2019

(54) DATA EXCHANGE COMMON INTERFACE CONFIGURATION

(71) Applicant: InvestCloud Inc, Beverly Hills, CA (US)

(72) Inventors: Vicent Sos-Munoz, Beverly Hills, CA (US); Julian C. Bowden, London (GB); John W. Wise, West Hollywood, CA (US); Jason A. Nicholls, Los Angeles, CA (US)

(73) Assignee: InvestCloud Inc, West Hollywood, CA (US)

( * ) Notice: Subject to any disclaimer, the term of this patent is extended or adjusted under 35 U.S.C. 154(b) by 443 days.

(21) Appl. No.: 15/207,264

(22) Filed: Jul. 11, 2016

(65) Prior Publication Data

US 2018/0011884 A1    Jan. 11, 2018

(51) Int. Cl.
*G06F 16/22*       (2019.01)
*G06F 16/25*       (2019.01)

(52) U.S. Cl.
CPC .......... *G06F 16/2272* (2019.01); *G06F 16/25* (2019.01)

(58) Field of Classification Search
CPC ...................... G06F 17/30569; G06F 17/30336
USPC ...................................... 726/23, 11, 24, 4, 7
See application file for complete search history.

(56) References Cited

U.S. PATENT DOCUMENTS

| | | | |
|---|---|---|---|
| 2001/0044795 A1* | 11/2001 | Cohen ............... | G06F 17/30699 |
| 2003/0037034 A1* | 2/2003 | Daniels ............... | G06Q 10/087 |
| 2003/0149699 A1* | 8/2003 | Tsao .......................... | G06F 8/71 |
| 2005/0055357 A1* | 3/2005 | Campbell ................ | G06F 8/61 |
| 2008/0306984 A1* | 12/2008 | Friedlander ............ | G16H 10/60 |
| 2010/0174693 A1* | 7/2010 | Chandrasekhara ........................ | G06F 17/30569 707/698 |
| 2014/0068047 A1* | 3/2014 | Williams ............ | H04L 41/5077 709/223 |
| 2014/0195514 A1* | 7/2014 | Stein ................. | G06F 17/30566 707/722 |

FOREIGN PATENT DOCUMENTS

DE              19751273 A1 *  5/1999

* cited by examiner

*Primary Examiner* — Jay A Morrison
*Assistant Examiner* — Ken Hoang
(74) *Attorney, Agent, or Firm* — Patent Ingenuity, P.C.; Samuel K. Simpson

(57) ABSTRACT

A system comprises a processor that that receives, through a network, a first data structure from a first source system. Further, the processor receives, through the network, a second data structure from a second source system. In addition, the processor normalizes the first data structure and the second data structure according to a common interface such that at least one constituent of the common interface is immutable, the common interface is backward compatible, and the common interface is forward compatible. The first data structure is at least partially distinct from the second data structure.

15 Claims, 7 Drawing Sheets

DATA EXCHANGE COMMON INTERFACE CONFIGURATION

BACKGROUND

1. Field

This disclosure generally relates to the field of computing devices. More particularly, the disclosure relates to interfaces for exchanging data between computing devices.

2. General Background

Various systems are utilized to exchange data between an entity and a user. When such systems are utilized to store and analyze large amounts of user data, various problems limit the usefulness of such data.

For instance, problems often occur with data integrity. Examples include incomplete historical data, inaccurate data, data that is represented in a limiting format, data definitions that are ambiguous or ill-defined, data that is not delivered by the requested time, data files that are missing dependencies, etc.

Also, various problems occur with customer relation management ("CRM") systems, i.e., forms-based systems that automate and synchronize interactions between an entity and a customer. For example, data in a CRM system may be maintained in various data files across an organization. Further, the data may be stale, e.g., client contact details may be incomplete or out of date.

In other words, current systems do not optimize utilization of their corresponding underlying data structures. As a result, upgrades to new versions of systems is often difficult. For example, data cannot be transferred effectively to a new system if such data is missing or incomplete. Therefore, current systems do not effectively provide reliable and robust data integrity.

SUMMARY

In one aspect of the disclosure, a system is provided. The system comprises a processor that that receives, through a network, a first data structure from a first source system. Further, the processor receives, through the network, a second data structure from a second source system. In addition, the processor normalizes the first data structure and the second data structure according to a common interface such that at least one constituent of the common interface is immutable, the common interface is backward compatible, and the common interface is forward compatible. The first data structure is at least partially distinct from the second data structure. The common interface is independent of the first data structure and the second data structure.

In another aspect of the disclosure, a computer program product is provided. The computer program product comprises a non-transitory computer useable storage device having a computer readable program. The computer readable program when executed on a computer causes the computer to receive, with a processor through a network, a first data structure from a first source system. Further, the computer readable program when executed on the computer causes the computer to receive, with the processor through the network, a second data structure from a second source system. The second data structure is at least partially distinct from the first data structure. In addition, the computer readable program when executed on the computer causes the computer to normalize, with the processor, the first data structure and the second data structure according to a common interface such that at least one constituent of the common interface is immutable. The common interface is backward compatible. The common interface is forward compatible. The common interface is independent of the first data structure and the second data structure.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A data exchange CI configuration is provided. The data exchange common interface provides normalization of data received externally from a source system. Further, the data exchange common interface is independent of an underlying data implementation. In other words, the data exchange common interface does not rely on a data structure of data that is received.

Figure 1:
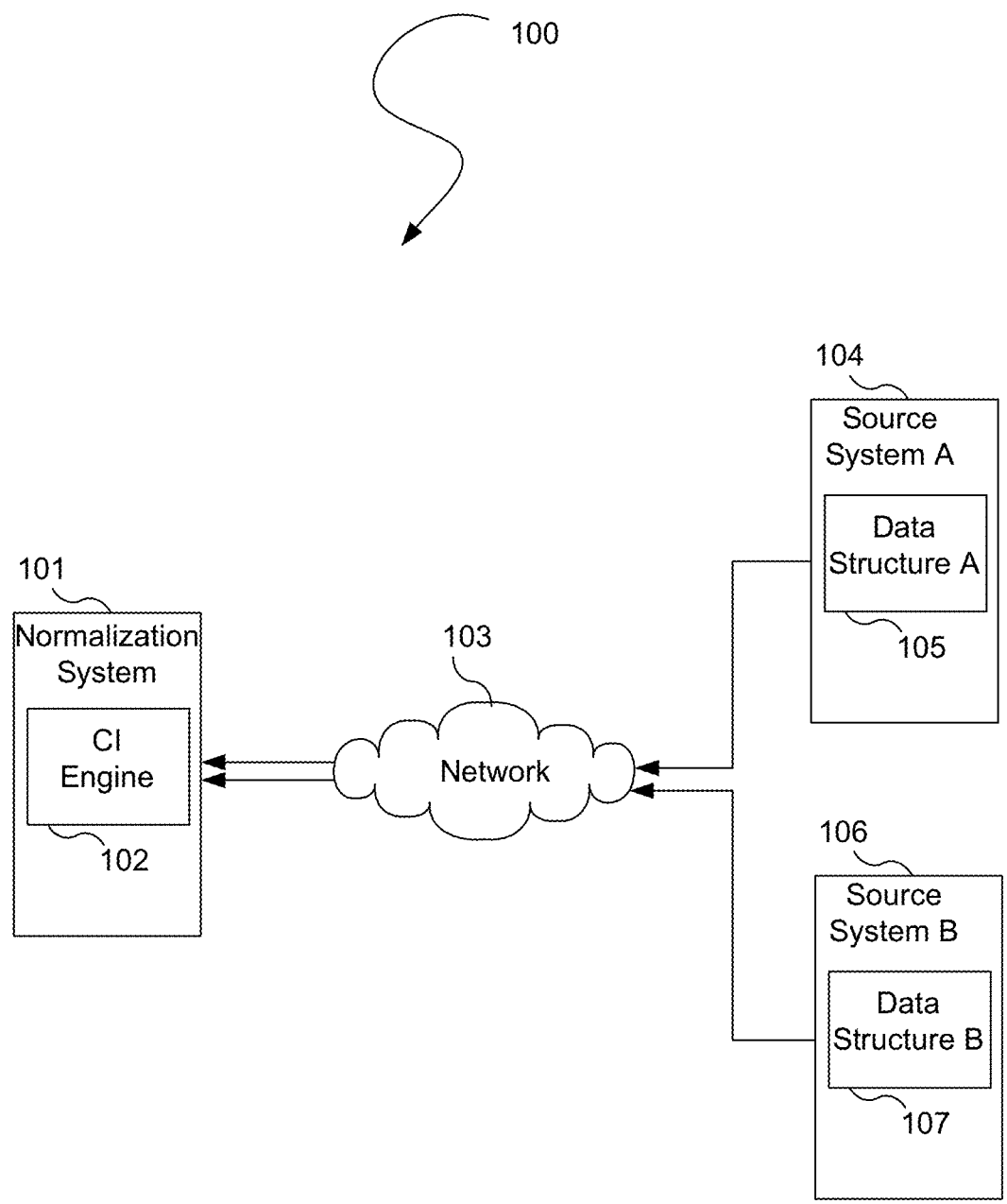
FIG. 1 illustrates a data exchange common interface ("CI") configuration.

FIG. 1 illustrates a data exchange CI configuration 100. The data exchange CI configuration 100 includes a normalization system 101 that has a CI engine 102 that performs data normalization. The normalization system 101 receives data through a network 103, e.g., a computerized network, based upon different data structures from various source systems. For example, source system 104 may store data according to a first data structure 105 whereas source system 106 may store data according to a second data structure 107 that is distinct from the first data structure 105.

The CI engine 102 provides a layer of interaction that allows for a system accessing the CI engine 102 through the normalization system 101 to communicate with external systems such as, for example, source system 104 and source system 106. In other words, the CI engine 102 allows for a system to communicate with external systems having different data structures in a normalized manner, i.e., a standard format.

The data exchange CI configuration 100 allows for backward compatibility and forward compatibility. By being backward compatible, the data exchange CI configuration 100 ensures that newer versions of the CI engine 102 or updates to the CI engine 102 are compatible with external systems in communication with the CI engine 102. By being forward compatible, the data exchange CI configuration 100 ensures that external systems that are more advanced than the current version of the CI engine 102 are still able to communicate with the CI engine 102. For instance, graceful degradation is an approach that may be utilized to provide the CI engine 102 with at least limited functionality even if the CI engine 102 communicates with an external source system that has a more advanced configuration than that of the CI engine 102. For example, if certain fields or other aspects of the CI engine 102 are unavailable as a result of the difference in technologies between the CI engine 102 and the external source system, the data exchange CI configuration 100 still allows communication to take place between the CI engine 102 and the external source system. The external source system may degrade to provide at least limited functionality even if certain technologies presumed to be available for the CI engine 102 are not available.

Figure 2:
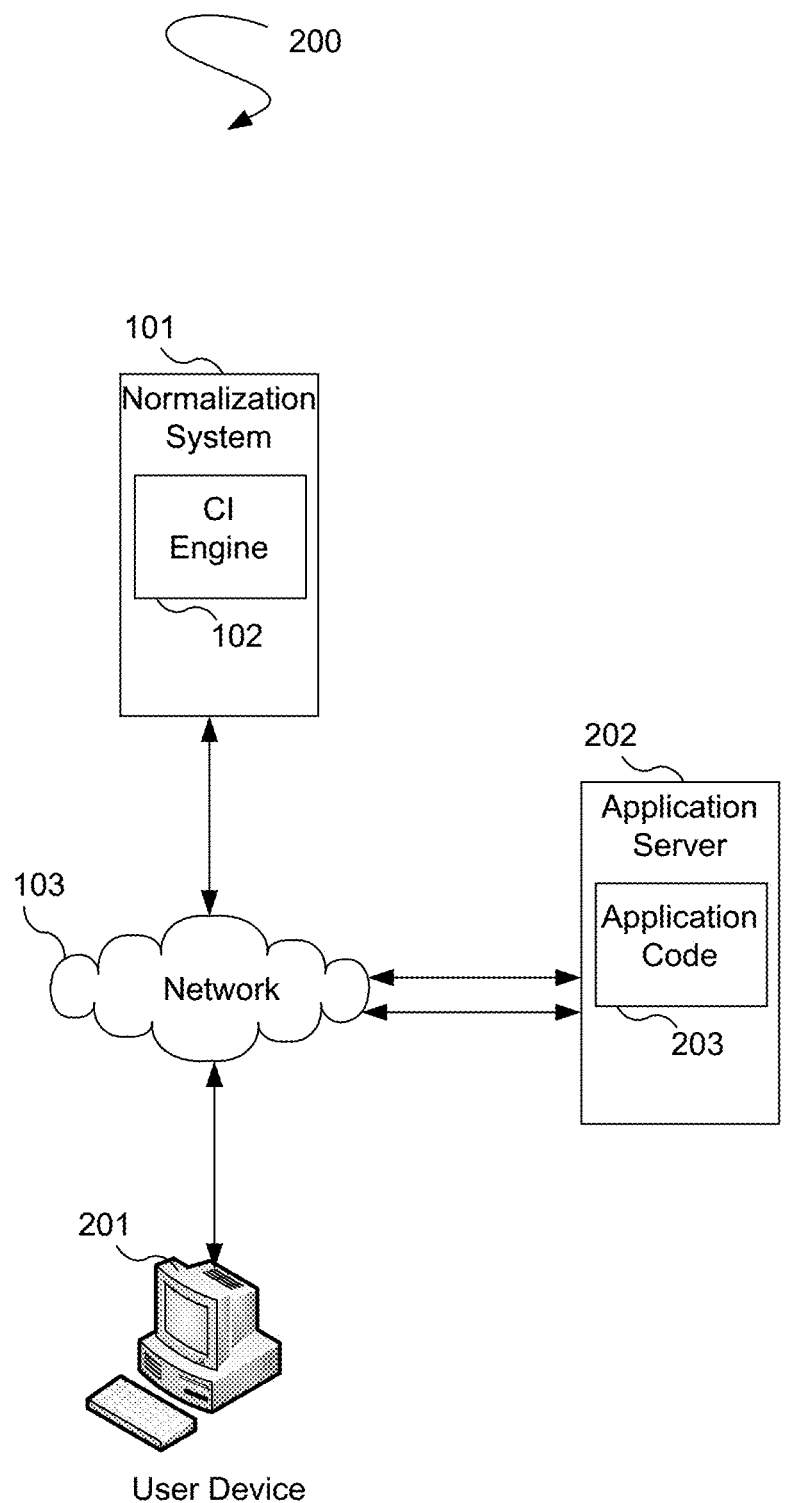
FIG. 2 illustrates the data exchange CI configuration being utilized to communicate with an application server.

FIG. 2 illustrates the data exchange CI configuration 100 being utilized to communicate with an application server 202. In other words, the data exchange CI configuration 100 allows the application server 202 to communicate with an external source system, e.g., source system 104 and/or source system 105 as illustrated in FIG. 1, via a normalized data structure. Further, the application server 202 may have application code 203 that is utilized by the application server 202 to provide an application to a user device 201 that requests access to the application via the network 103.

Therefore, the data exchange CI configuration 100 illustrated in FIGS. 1 and 2 allows the application server 202 to obtain data for utilization by the application code 203 whereby such data is provided to the application code 203 via a normalized data structure. By being normalized, the data structure provided by the CI engine 102 to the application server 202 is in a format that is understood by the application code 203 independent of the underlying data structure of the external source system.

The user device 201 may be a device that is capable of accessing the application provided by the application server 202. For example, the user device 201 may be a personal computer ("PC"), laptop computer, tablet device, smartphone, smart television, smart wearable device, set top box, kiosk, etc.

Figure 3:
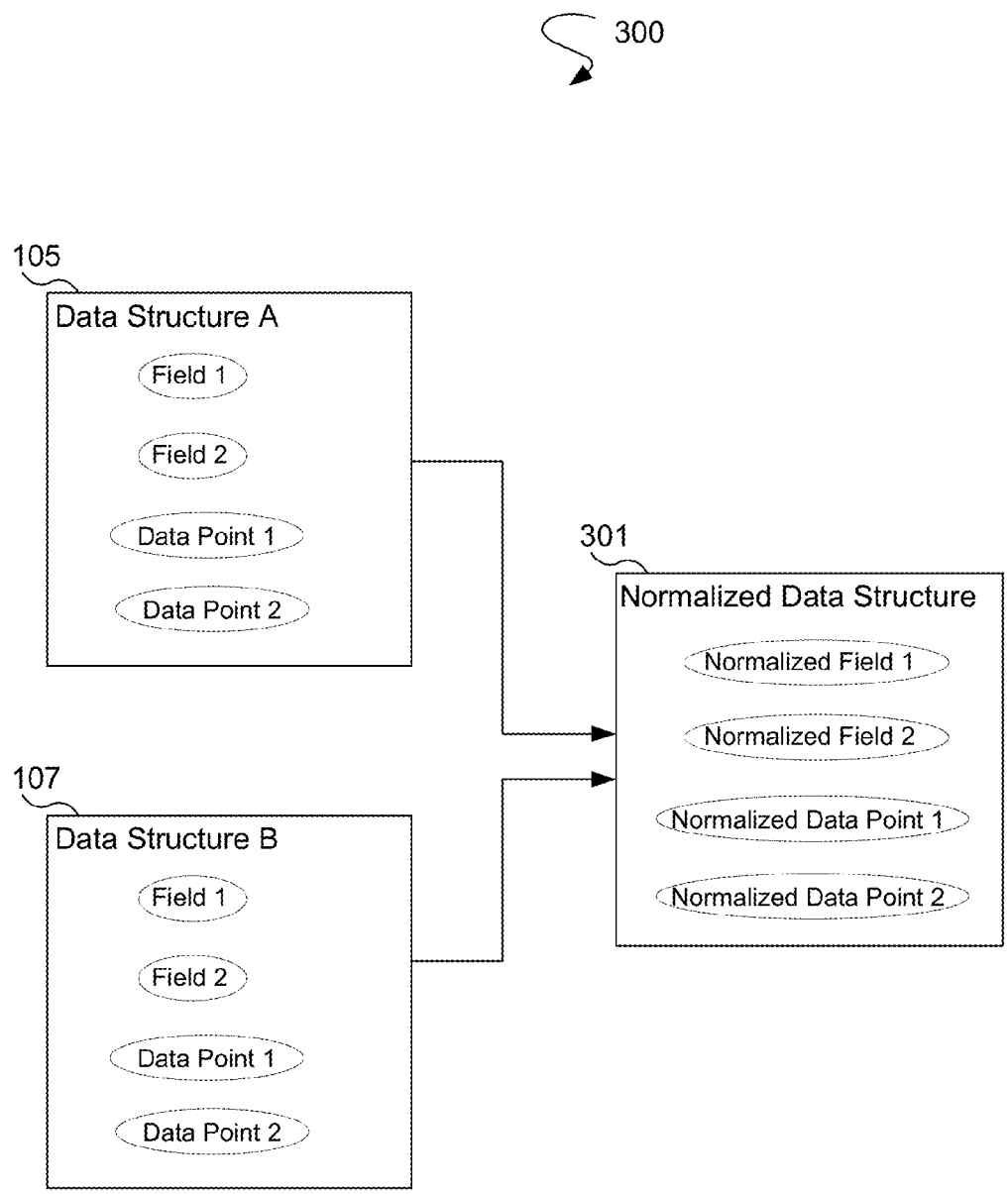
FIG. 3 illustrates an example of a mapping performed by the CI engine illustrated in FIGS. 1 and 2 of external system data structures into a normalized data structure.

FIG. 3 illustrates an example of a mapping 300 performed by the CI engine 102 illustrated in FIGS. 1 and 2 of external system data structures into a normalized data structure 301. For instance, the data structure 105 from the source system 104 may have various fields and data points that utilize certain syntax and semantics according to the data model of the data structure 105. In contrast, the data structure 107 from the source system 106 may have the same fields and data points that utilize different syntax and semantics according to the data model of the data structure 107. An implementation of the mapping 300 may a combination of similar and/or different fields and data points from different external source systems, but the same fields and data points are illustrated in FIG. 3 for ease of illustration of the normalization process of the same data from different data models being mapped to the same normalized data structure.

The mapping 300 may be performed according to syntax and/or semantics. Syntax refers to the ordering of particular constituents of a data structure whereas semantics refer to the meaning of such constituents. In various embodiments, the CI engine 102 is prescriptive on syntax. In other words, constituents of the normalized data structure 301, e.g., fields, have to be known and immutable to provide backward and forward compatibility. By being immutable, such constituents cannot be modified. New constituents may be added to the normalized data structure 301, but existing constituents are immutable. For example, the syntax may necessitate a particular ordering of fields in a table.

Further, in various embodiments, the CI engine 102 may or may not be prescriptive on semantics. In other words, the CI engine 102 may be prescriptive on semantics for some items whereas the external source system may completely define other items. The context of the data may determine whether or not the CI engine 102 is prescriptive on semantics for a particular item. For instance, the semantics of the terms "buy" and "purchase" may mean the same thing in one type of environment, e.g., ordering a physical product, but may have different meanings in a different environment, e.g., placing an order in a securities environment where the term "buy" has a particular meaning, but the term "purchase" is not necessarily applicable.

The CI engine 102 performs a normalization process to generate the mapping 300 so that constituents and data points are translated from external source systems to have the same term for the same meaning. The CI engine 102 normalizes data so that each client, e.g., user device 201, has a set of applets. As a result, a user that utilizes the user device 201 illustrated in FIG. 2 is able to view normalized data through the application provided by the application code 203 without any dependency on the external source system. Since the CI engine 102 is effectively decoupled from the transmission structure, the CI engine 102 is independent of any particular Application Program Interface ("API"). In other words, the CI engine 102 effectively provides API insulation so that a programmer, developer, etc. that utilizes the CI engine 102 does not have to be aware of any particular API dependent action. The CI engine 102 is transparent with servers with different APIs. For example, a programmer, developer, etc. may be aware of a particular condition that has to be performed via the CI engine 102 prior to processing by an external server and may perform that condition without knowledge of any particular format, code requirements, etc. of an API associated with that external server.

In various embodiments, the mapping 300 defines a set of rules for the translation of constituents and data points. After the mapping is defined, the data from the external source systems may be automatically loaded and/or translated according to the mapping by a processor associated with the CI engine 102. For instance, the CI engine 102 may automatically apply normalization to particular fields via the mapping rules upon receipt of data from an external server. In other words, the CI engine 102 may be notified of new data that has been received and may automatically retrieve that data to automatically apply the mapping. In various other embodiments, the mapping may be automatically defined by an artificial intelligence ("AI") system.

Examples of syntax include delimited, fixed length, XML, JSON, YAML, headers/trailers, multi-layout, binary documents, and proprietary formats. Other types of syntactic rules may also be utilized.

Further, examples of mappings include conditions, cached lookups, resource retrieval, one to many, many to one, many to many, and code snippets. Other types of mappings may also be utilized. The mapping may be referred to as a data dictionary.

Figure 4:
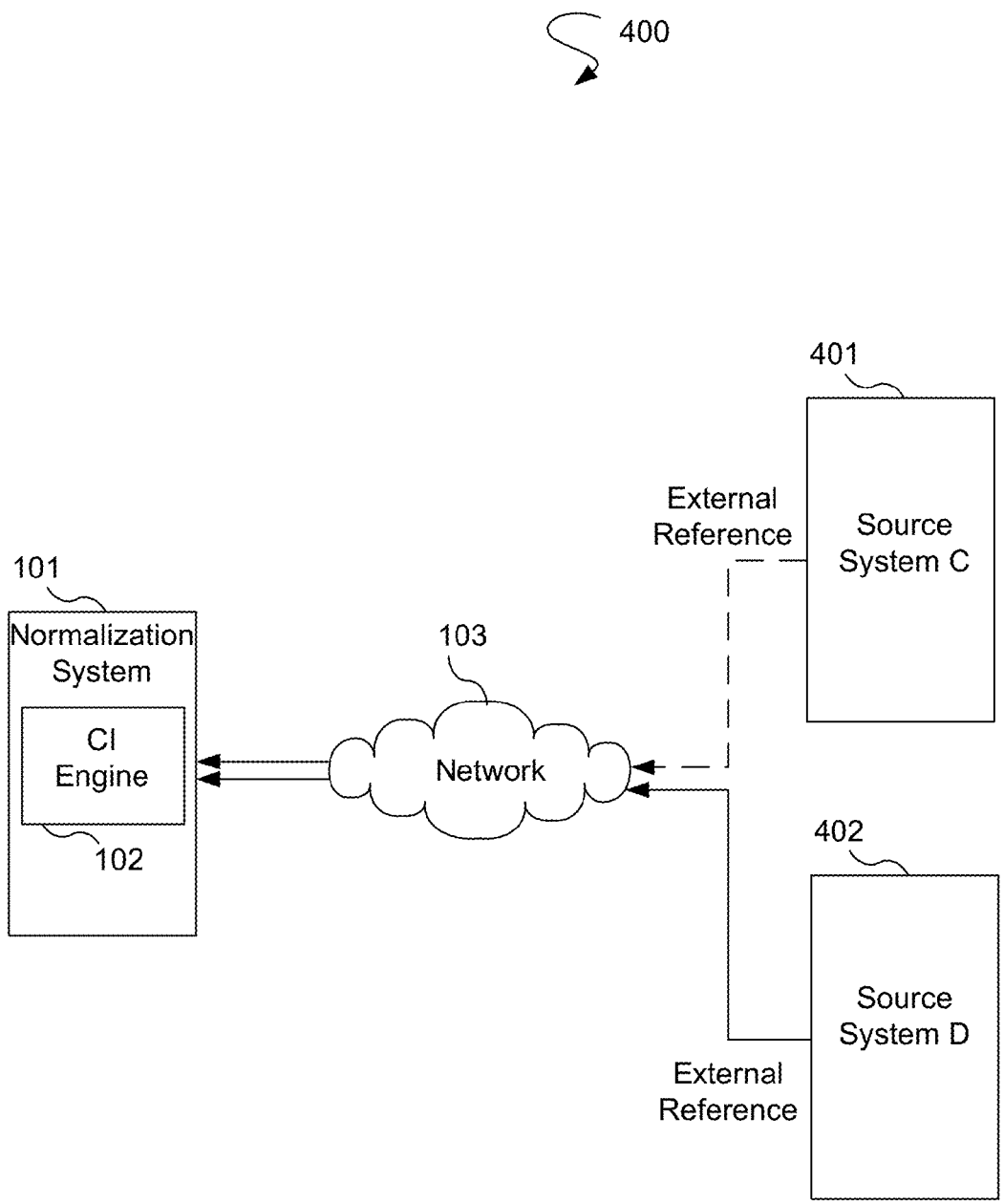
FIG. 4 illustrates an automated transitioning system.

FIG. 4 illustrates an automated transitioning system 400. The automated transitioning system 400 automatically transfers communication from a source system 401, e.g., a legacy system, to a source system 402, e.g., a newer system. Normalization is performed by maintaining an external reference to a data point of the source system 401 that is transferred to the source system 402. For example, the automated transitioning system 400 may refer to a particular account number stored by the source system 401 according to an internal account number known to the CI 102. That mapping is deemed the external reference. When the legacy system is removed and the newer system is activated, the CI engine 102 is still able to access the same data point as a result of maintaining the external reference. As a result, a user utilizing the user device 102 illustrated in FIG. 2 is able to continue to access the application provided by the application code 203 according to the same account number without even being aware of the automated transition from the legacy system to the newer system. The immutability aspect of the CI engine 102 helps to ensure that no matter which version of an external source system is being utilized, the user device 102 or other client device will continue to function effectively when communicating with the application server 202 illustrated in FIG. 2 that obtains data from an external source system.

Further, the automated transitioning system 400 is not limited to complete removal of a legacy system. The automated transitioning system 400 may also be utilized for the transfer of only some data from one system to another system. For instance, additional systems may be added to help with data storage capacity, bandwidth, etc.

Figure 5:
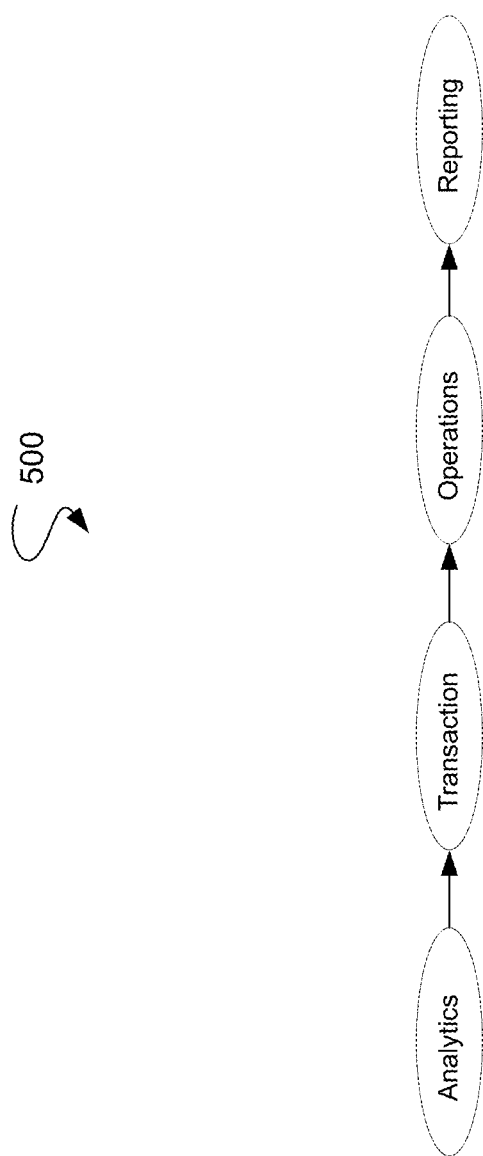
FIG. 5 illustrates an example of a life cycle model to which the CI engine illustrated in FIGS. 1 and 2 may be applied.

FIG. 5 illustrates an example of a life cycle model 500 to which the CI engine 102 illustrated in FIGS. 1 and 2 may be applied. As an example in the securities environment, the life cycle model 500 may include an analytics phase, a transaction phase, an operations phase, and a reporting phase. Each phase may be represented by a different view of the application provided by the application code 203 illustrated in FIG. 2. Thus, the CI engine 102 represents the data for each phase in the life cycle model 500. Further, the CI engine 102 allows a user associated with the user device 102 illustrated in FIG. 2 to interface at one phase of the life cycle model 500 even if another phase of the life cycle model 500 has not been accessed. The CI engine 102 allows for a stateless environment in which data is represented by a completely independent unit of work.

Utilization of the unit of work allows the CI engine 102 to divide work into smaller tasks. Further, such tasks may be distributed to one or more servers to process those tasks.

Further, the CI engine 102 allows for tracking of dependencies amongst data. An example of a dependency is a condition that one or more transactions cannot be loaded until an account associated with the data is loaded. The transactions may be quantified via units of work so that the amount of data for which dependencies are being tracked may be determined. For instance, a server executing a load and a server managing that load may then understand the amount of data that has been processed so far and the amount of data that remains to be processed. As a result, the unit of work allows for more effective communication between servers to process data, e.g., track dependencies amongst data.

In various embodiments, each phase of the life cycle model 500 may have a distinct common interface that is accessible by the user associated with the user device 102 illustrated in FIG. 2. In other words, a user may access a different view for the analytics phase, a different view for the transaction phase, a different view for the operations phase, and a different view for the reporting phase. In other words, one common interface per phase, data point, etc., may be generated by the CI engine 102.

Figure 6:
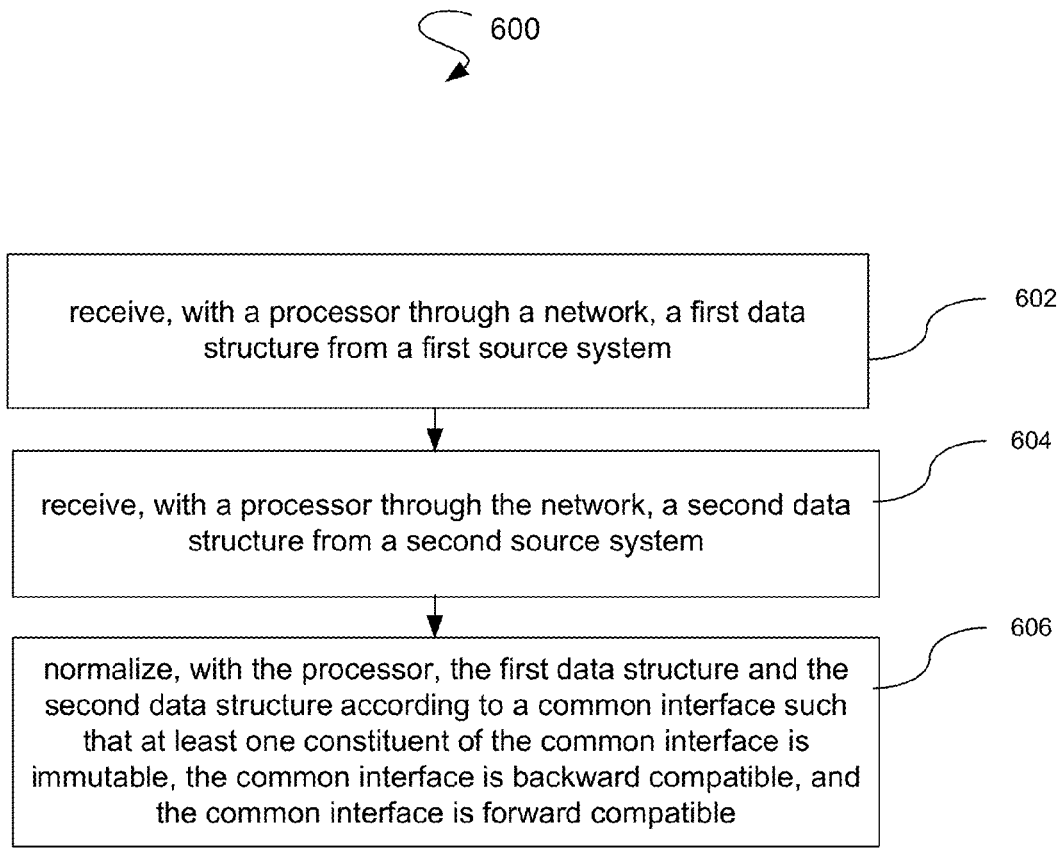
FIG. 6 illustrates a process that may be utilized to perform normalization for a CI.

FIG. 6 illustrates a process 600 that may be utilized to perform normalization for a CI. At a process block 602, the process 600 receives, with a processor through the network 103, a first data structure 105 from the first source system 104. Further, at a process block 604, the process 600 receives, with a processor through the network 103, a second data structure 107 from the second source system 106. The second data structure 107 is at least partially distinct from the first data structure 105. In addition, at a process block 606, the process 600 normalizes, with the processor, the first data structure 105 and the second data structure 107 according to the CI such that at least one constituent of the CI is immutable, the CI is backward compatible, and the CI is forward compatible.

The processes described herein may be implemented in a specialized or a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code, intermediary language or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized or general, multi-purpose or single purpose processor as described above. The CI configurations described herein are device-independent as they may be utilized to send and receive messages for a variety of types of computing devices such as personal computers, laptops, tablet devices, smartphones, kiosks, set top boxes, etc.

Figure 7:
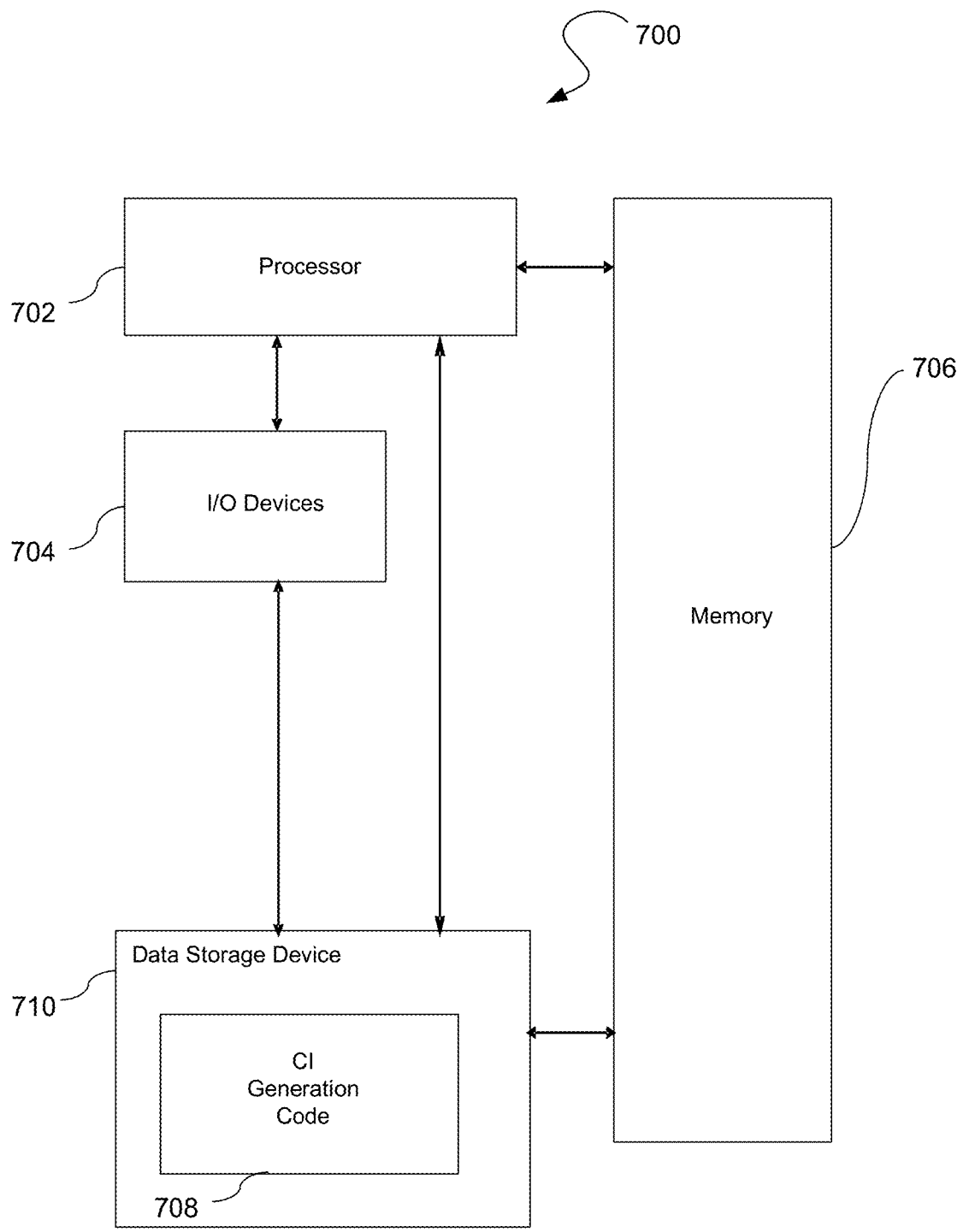
FIG. 7 illustrates a block diagram of a system that generates a CI.

FIG. 7 illustrates a block diagram of a system 700 that generates a CI. In one embodiment, the station or system 700 is implemented utilizing a specialized or general purpose computer or any other hardware equivalents. Thus, the station or system 700 comprises a processor 702, a memory 706, e.g., random access memory ("RAM") and/or read only memory (ROM), CI generation code 708, a data storage device 710 that stores the CI generation code 708, and various input/output devices 704, e.g., audio/video outputs, audio/video inputs, a receiver, a transmitter, a speaker, a display, an image capturing sensor, a clock, an output port, a user input device, etc.

The CI generation code 708 may be represented by one or more software applications or a combination of software and hardware where the software is loaded from a storage medium such as a storage device, e.g., a magnetic or optical drive, diskette, or non-volatile memory and operated by the processor 702 in the memory 706 of the computer. As such, the CI generation code 708 and associated data structures of the present disclosure may be stored on a computer readable medium such as a computer readable storage device, e.g., RAM memory, magnetic or optical drive, diskette, etc.

The system 700 may be utilized to implement any of the configurations. In one embodiment, the CI generation code 708 is stored by the processor 702. In another embodiment, the CI engine 102 illustrated in FIGS. 1 and 2 is the processor 702.

The data exchange CI configuration 100 illustrated in FIG. 1 solves the technology problem of data integrity across computing systems that communicate with each other. Further, the solution provided by the data exchange CI configuration 100 is necessarily rooted in technology as the CI engine 102 receives different data structures through the computerized network 103 and normalizes the data structures according to a CI. The processor 702 illustrated in FIG. 7 may be specialized to perform such normalization via the CI engine 102.

It is understood that the processes, systems, apparatuses, and computer program products described herein may also be applied in other types of processes, systems, apparatuses, and computer program products. Those skilled in the art will appreciate that the various adaptations and modifications of the embodiments of the processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

We claim:

1. A system comprising:
a processor that receives, through a network, a first data structure from a first source system, receives, through the network, a second data structure from a second source system, normalizes the first data structure and the second data structure into a normalized data structure corresponding to a common interface by translating a first format of at least one constituent of the first data structure and a second format of at least one constituent of the second data structure into a normalized format of the normalized data structure according to one or more mapping rules, and establishes at least one constituent of the common interface with a known format as immutable, the first format being at least partially distinct from the second format, the common interface being independent of the first data structure and the second data structure, wherein the common interface is associated with a first phase of a life cycle model, the common interface being distinct from an additional common interface that is associated with a second phase of the life cycle model, the second phase of the life cycle model being distinct from the first phase of the life cycle model, the first phase of the life cycle model being viewed via the common interface independently of the second phase of the life cycle model that is viewed via the additional common interface.

2. The system of claim 1, wherein the common interface is prescriptive on syntax.

3. The system of claim 1, wherein the processor determines whether the common interface is prescriptive on semantics based on a context of the semantics.

4. The system of claim 1, wherein the processor prevents modification of a constituent of the common interface.

5. The system of claim 4, wherein the constituent is a field of the common interface.

6. The system of claim 1, wherein the processor allows for alteration of a constituent of the common interface.

7. The system of claim 6, wherein the constituent is a field of the common interface.

8. The system of claim 1, wherein the first source system is a legacy system and the second source system is a newer system than the legacy system to which data is transitioned.

9. A computer program product comprising a non-transitory computer useable storage device having a computer readable program, wherein the computer readable program when executed on a computer causes the computer to:
receive, with a processor through a network, a first data structure from a first source system;
receive, with a processor through the network, a second data structure from a second source system, the second data structure being at least partially distinct from the first data structure;
normalize, with the processor, the first data structure and the second data structure into a normalized data structure corresponding to a common interface by translating a first format of at least one constituent of the first data structure and a second format of at least one constituent of the second data structure into a normalized format of the normalized data structure according to one or more mapping rules; and
establishing at least one constituent of the common interface with a known format as immutable, the first format being at least partially distinct from the second format, the common interface being independent of the first data structure and the second data structure, wherein the common interface is associated with a first phase of a life cycle model, the common interface being distinct from an additional common interface that is associated with a second phase of the life cycle model, the second phase of the life cycle model being distinct from the first phase of the life cycle model, the first phase of the life cycle model being viewed via the common interface independently of the second phase of the life cycle model that is viewed via the additional common interface.

10. The computer program product of claim 9, wherein the common interface is prescriptive on syntax.

11. The computer program product of claim 9, wherein the computer is further caused to determine, with the processor, whether the common interface is prescriptive on semantics based on a context of the semantics.

12. The computer program product of claim 9, wherein the computer is further caused, with the processor, to prevent modification of a constituent of the common interface.

13. The computer program product of claim 12, wherein the constituent is a field of the common interface.

14. The computer program product of claim 9, wherein the computer is further caused to allow for alteration of a constituent of the common interface.

15. The computer program product of claim 14, wherein the constituent is a field of the common interface.

* * * * *